United States Patent
Matali Badia

(10) Patent No.: US 6,398,445 B1
(45) Date of Patent: Jun. 4, 2002

(54) SECURITY AND FIXING MECHANISM

(75) Inventor: Vicente Matali Badia, Valencia (ES)

(73) Assignee: UMB Espanola S.A. (ES)

( * ) Notice: Subject to any disclaimer, the term of this patent is extended or adjusted under 35 U.S.C. 154(b) by 0 days.

(21) Appl. No.: 09/178,261

(22) Filed: Oct. 23, 1998

Related U.S. Application Data

(63) Continuation of application No. PCT/ES98/00033, filed on Feb. 17, 1998.

(30) Foreign Application Priority Data

Feb. 25, 1997 (ES) .............................................. 9700398

(51) Int. Cl.$^7$ .............................................. B23B 31/10
(52) U.S. Cl. .................. 403/109.6; 403/324; 403/379.5
(58) Field of Search .......................... 403/109.1, 109.3, 403/109.5, 109.6, 109.8, 379.5, 324, 105

(56) References Cited

U.S. PATENT DOCUMENTS

| | | | | |
|---|---|---|---|---|
| 2,630,128 A | * | 3/1953 | Slater .................. | 403/109.3 X |
| 4,113,221 A | * | 9/1978 | Wehner .................. | 403/324 X |
| 4,183,565 A | | 1/1980 | Allemann .................. | 292/163 |
| 4,278,120 A | | 7/1981 | Hart et al. .................. | 411/190 |
| 4,602,890 A | | 7/1986 | Duda .......................... | 403/105 |
| 4,842,311 A | | 6/1989 | White .......................... | 292/85 |
| 6,050,740 A | * | 4/2000 | Dziedzic ................. | 403/324 X |

FOREIGN PATENT DOCUMENTS

ES 0245236 8/1979

* cited by examiner

*Primary Examiner*—Lynne H. Browne
*Assistant Examiner*—John R. Cottingham
(74) *Attorney, Agent, or Firm*—Baker Botts

(57) ABSTRACT

A safety and fixing mechanism allows a movable shape to move in one direction relative to a fixed shaped along an axis but automatically stops the moving shape from moving in the other direction. A ratchet machanism fastened to the fixed shape includes a ratchet element that is movably guided by a support in a direction substantially perpendicular to the axis. The ratchet element has an end portion that protrudes form the fixed shape toward the movable shape, the end portion having a flat end surface and an inclined end surface inclined to the axis. A spring biases the ratchet element relative to the fixed shape toward the movable shape. A perforated strip fastened to the movable shape has a plurality of spaced-apart holes lying in a row parallel to the axis, each hole being adapted to receive the end portion of the element.

4 Claims, 3 Drawing Sheets

SECURITY AND FIXING MECHANISM

This application is a continuation of PCT/ES98/00033 Feb. 17, 1998.

The present invention refers to a new safety and fixing mechanism, mainly intended for elevation towers, wherein a load supporting shape moves inside another fixed shape, said mechanism being used for fastening one to another, allowing for the relative upwards displacement of mobile shape over the fixed shape, not permitting the downwards displacement of mobile shape without acting on said security and fixing mechanism.

The known traditional systems are just fixing mechanisms, as they are used to fix the telescopic movement of a tubular shape with respect to another tube, so that when releasing the fixing mechanism both shapes will move freely without limits in their movement. In the case that the elevation forces fail, the mobile shape will fall.

An example of these traditional systems is the typical bolt mechanism, which is fixed and released by hand, not having a safety system in it. This implies the risk of accidents due to falls of parts of equipment what may cause damages to persons and materials.

Another traditional system widely used consist of mobile and fixed shapes provided with matching serie of holes which can be interconnected by means of stems or pins, such that when passing through a pair of matching holes the relative displacement of both shapes will be avoided. In this case there still is the risk as mentioned above since very often the pins used are not of the adequate size or theyr are not in good working condition.

A very similar case occurs when an open flange is applied on one of these shapes the other shape being fastened by means of a screw pressure, said screw being actuated by means of a handle or knob. The pressure exerted by the screw causes the fastening of one shape onto the other, but always having the risk of a loss of pressure due to corrosion or friction in the device.

With the safety and fixing mechanism object of the present invention it is intended to avoid these problems in a simple, precise, efficient manner.

This mechanism basically comprises a strip perforated according to a given configuration, fastened to a shape and a ratchet system, matching the holes in the plate, which engages with said holes, said ratchet system being fixed to the exterior shape.

It consist of a mechanism developed to lock a tubular shape telescopically arranged inside another tubular shape so that the interior shape may only moves upwards since said mechanism prevents the donwards displacement of said interior shape. Also, said mechanism can be released so that the interior shape can be displaced downwards.

The present fixing system is a safety system, the release of said mechnism being produced by the latch displacement, leaving the ratchet ready to be introduced into next adjacent hole in the case that the elevation force fails to act and preventing the interior shape to fall down. When the elevation force acts again, the interior profile will move upwards without any help. Therefore this mechanism operates on a positive safety basis.

In such a case, as a safety system, the fastening is obtained by means of strip provided with a series of holes of a special configuration and fastened to the shape which is to be secured. In other words, the ratchet as well as the perforated strip have specific construction details.

The nature of the present invention will be better understood with the following drawings in which.

Figure 1:
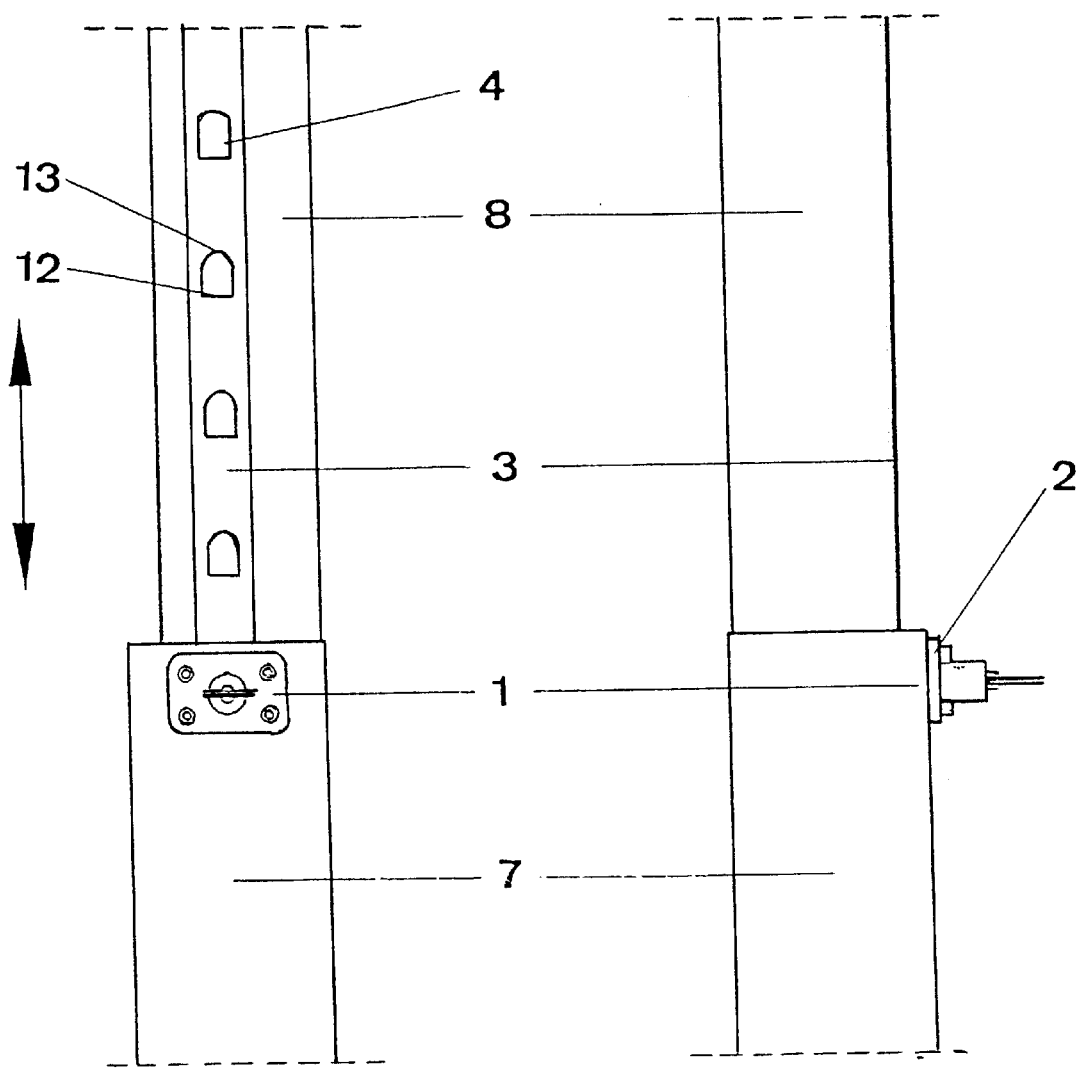
FIG. 1 shows an elevation of a fixing and safety system according with present invention in a practical embodiment mounted on shapes.
Figure 2:
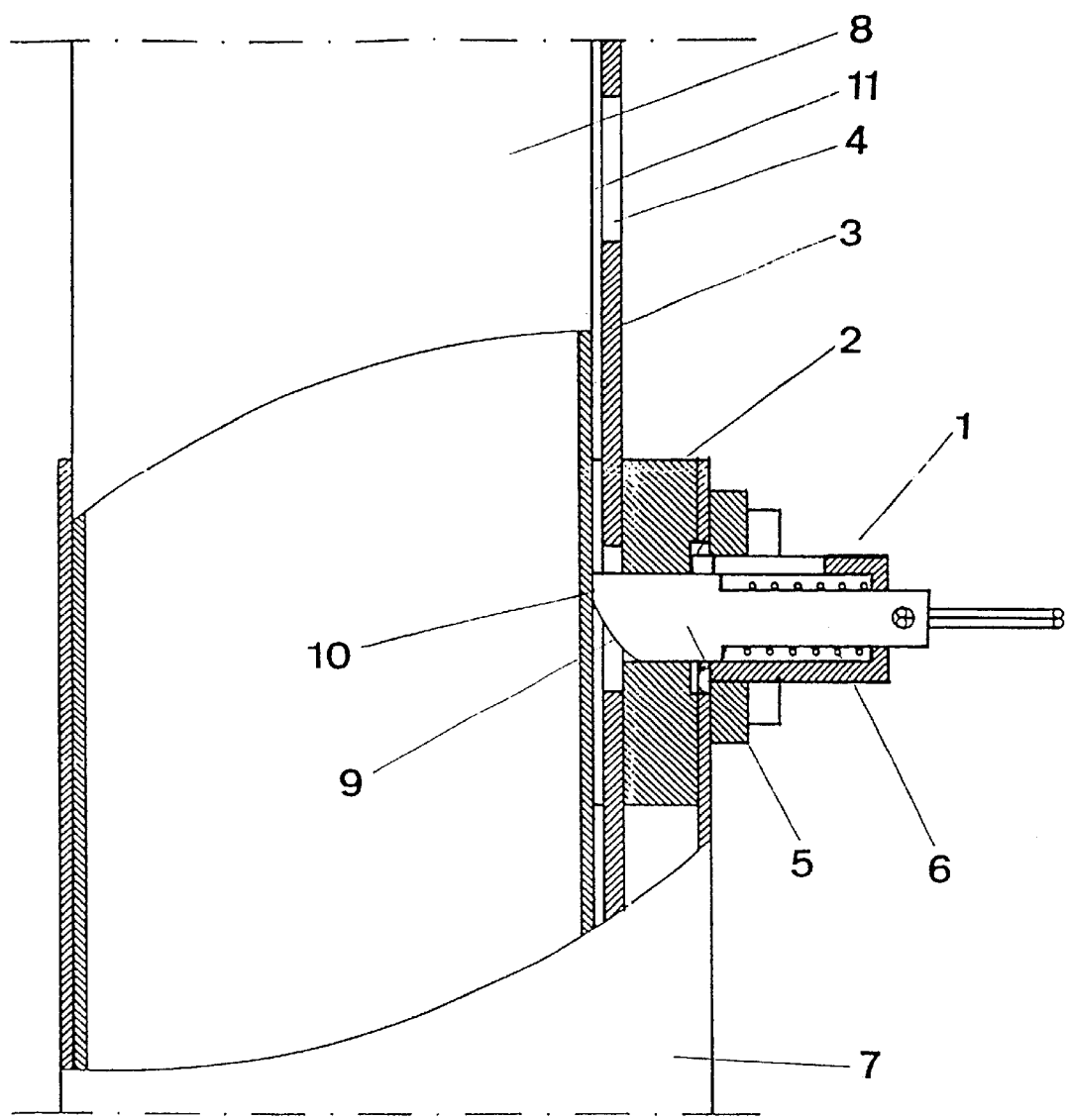
FIG. 2 shows a sectional view of the fixing and safety mechanism mounted on shapes.

As it can be seen in the figures, there is a ratchet (1) with a support (2), engaged to a strip (3) by means of holes or drills (4) with an ratchet element (5) sliding over said strip (3) pushed by a spring (6). This mechanism being mounted on a fixed shape (7), acting and fixing another moving shape (8).

The ratchet (1) comprises an element (5), prefrably solid, machined, provided with a latch (9), and a flat end portion (10), and is pushed by means of a spring (6) or similar, said spring (6) exerting a pressure over said flat portion against the moving shape (8) surface (11), which is to be secured when the ratchet (1) is inserted into one of the strip (3) holes (4), said strip being fastened by any known system to said mobile shape (8).

Furthermore, the ratchet is guided by a supporting element (2), preferably solid, machined up to said strip (3) in order to ensure its (mechanicla) mechanical strength against any strains in the assembly caused by stresses created during engaging action.

The perforated strip (3) comprises a series of through holes (4). Said strip (3) may be provided with holes for the connection to shape by means of rivets, welding, etc. The holes (4) having the preferred configuration as shown in the figures, have a flat portion (12) to act on the latch (9) element (5) and a half circle portion (13) to serve as support for the engaging element.

The size and proportions of these holes (4) and the ratchet (1) elements will depend on the load conditions and materials in order to ensure a fully reliable engagement.

The perforated strip (3) is fastened to the shape (8), leaving a small gap as shown in the figures. This gap is intended to allow for the strip (3) to be supported on the element with a wide safety margin when the safety ratchet (1) element (5) is inserted into engagement holes (4).

Figure 3:
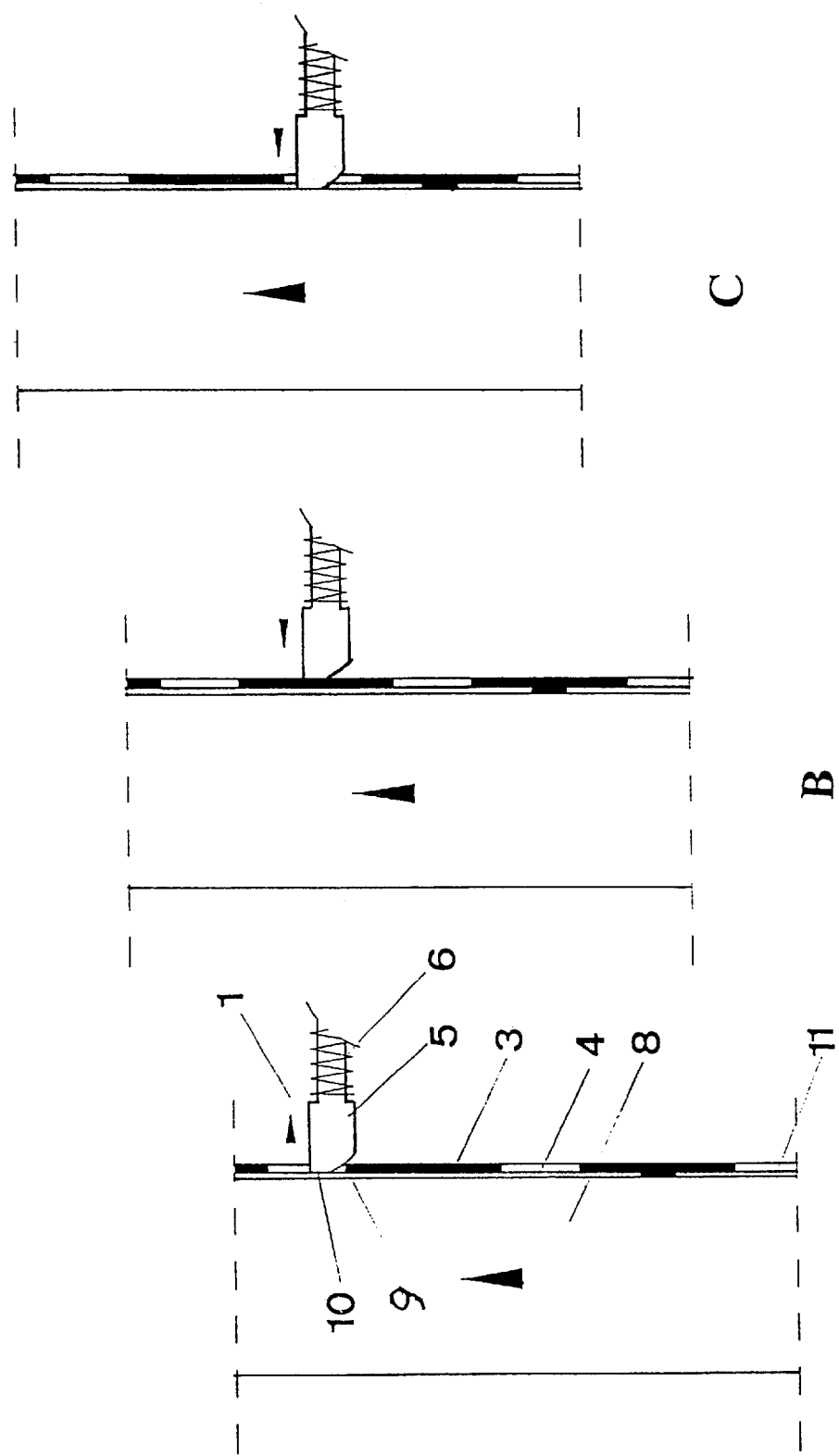
FIG. 3 shows schematic views (A, B and C) of the device with different working sequences.

The operation is simple as it can be seen in the enclosed figures, mainly in FIG. 3, where the arrows show the direction of the displacement of the moving shape (8) and the ratchet (1) element (5) which is fastened to the fixed shape (7).

Starting from a resting position, when applying a force to elevate the shape (8) to raise a load (not shown in the figure), when the element (5) is inserted in a hole (4, FIG. 3A) of the strip (3), the flat part (9) will slide slowly over the shape (8) surface (11), as a result of the pressure exerted by the spring (6) acting against this surface, so that the latch meets the flat portion (12) of the hole (4) forcing the latch, and with it the whole element, towards the exterior against the spring (6) pressure.

Once the shape (8) gets to that position, it will continue moving upwards, and (tha) the element flat surface (9) will slide over the strip surface (3, FIG. 3B), to reach next hole (4) where by the spring pressure (6) this element will be positioned in said hole (FIG. 3C) and so on while the shape (8) is displaced upwards.

In this last position (FIG. 3C) if the shape (8) did not move further, then the shape, forced by its own weight, will move downwards so that the curved surface (13) of hole (4) meets the element (5) which will bear the whole weight preventing the fall and acting as a safety element. If the elevating force happens to fail while the element (5) slides over the strip (3) surface, not over surface (11), then the shape (8) would get loose until said element (5) gets inserted in next through hole (4).

Therefore, when the tubular shape is moving upwards, the ratchet slides and allows for that movement, but when the elevation force stops, then the ratchet is engaged in next hole, thus preventing a possible return. This operation prevents the (sahpe) shape (8) from moving downwards from any position due to the automatic engagement of the ratchet element (5), in each hole (4) met. It will be only possible to lower the interior shape (8) by releasing and holding the ratchet in order to release the perforated strip (3) fastened to said shape.

The latch system (9) and the insertion of said latch in the strip holes (3) is self adjustable relative to possible gaps between the interior tubular shape (8) moving upwards and the exterior shape (7). This self adjustment is produced when the flat end (10) of the ratchet (1) abbuts onto said shape surface (11), always having the same distance between the latch end (9) and the contact line of said latch with the strip (3), thus ensuring a correct system operation.

Once the nature of present invention as well as a practical embodiment of the same have been fully described, it is only to be added that its shape, materials and arrangement can be modified as long as these modifications do not alter basically the features which are claimed as follows:

What is claimed is:

1. A safety and fixing mechanism for a fixed shape and a movable shape, the movable shape being movable relative to the fixed shape along an axis, comprising a ratchet mechanism having a support that is fastened to the fixed shape, a ratchet element that is movably guided by said support in a direction substantially perpendicular to the axis, said element having an end portion that protrudes from the fixed shape toward the movable shape, said end portion having a flat end surface parallel to the axis and an inclined end surface inclined to the axis, and a spring biasing said element relative to the fixed shape toward the movable shape; and a perforated strip fastened to the movable shape and having a plurality of spaced-apart holes lying in a row parallel to the axis, each hole being adapted to receive the end portion of the element, and wherein the ratchet mechanism allows movement of the movable shape relative to the fixed shape in one direction by displacement of the element from each hole against the bias of the spring by a force applied by an edge of each hole on the inclined end surface of the element and stops movement of the movable shape in the other direction by protrusion of the end portion into one of the holes under the biasing of the spring.

2. The safety and fixing mechanism according to claim 1, wherein the flat surface of the end of the element is oriented so that it contacts surfaces of the perforated strip between the holes alternatively with surfaces of the movable shape in sliding relation when the movable shape is moving in said one direction.

3. The safety and fixing mechanism according to claim 1, wherein the edge of each hole in the perforated strip that engages the inclined surface of the element is a flat edge.

4. The safety and fixing mechanism according to claim 3, wherein each hole in the perforated strip has a semi-circular edge opposite the flat edge.

* * * * *